United States Patent
Altermann et al.

(10) Patent No.: US 11,894,585 B2
(45) Date of Patent: Feb. 6, 2024

(54) DELIVERY UNIT FOR AN ANODE CIRCUIT OF A FUEL CELL SYSTEM FOR DELIVERING A GASEOUS MEDIUM, AND FUEL CELL SYSTEM

(71) Applicant: Robert Bosch GmbH, Stuttgart (DE)

(72) Inventors: Peter Altermann, Stuttgart (DE); Alexander Hero, Lehrensteinsfeld (DE); Armin Merz, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 17/426,233

(22) PCT Filed: Jan. 8, 2020

(86) PCT No.: PCT/EP2020/050243
§ 371 (c)(1),
(2) Date: Jul. 28, 2021

(87) PCT Pub. No.: WO2020/156763
PCT Pub. Date: Aug. 6, 2020

(65) Prior Publication Data
US 2022/0093943 A1    Mar. 24, 2022

(30) Foreign Application Priority Data

Jan. 30, 2019   (DE) ...................... 10 2019 201 170.5

(51) Int. Cl.
*H01M 8/04089*   (2016.01)
*B01D 53/24*   (2006.01)
(Continued)

(52) U.S. Cl.
CPC ........ *H01M 8/04097* (2013.01); *B01D 53/24* (2013.01); *F04F 5/14* (2013.01);
(Continued)

(58) Field of Classification Search
CPC ......... H01M 8/04097; H01M 8/04111; H01M 8/04164; H01M 8/04156; H01M 8/04201;
(Continued)

(56) References Cited

U.S. PATENT DOCUMENTS 2,203,077 A   6/1940   Carpenter
2006/0251935 A1   11/2006   Barrett et al.
(Continued)

FOREIGN PATENT DOCUMENTS

CN   2667677 Y   12/2004
CN   102612779 A   7/2012
(Continued)

OTHER PUBLICATIONS

Translation of International Search Report for Application No. PCT/EP2020/050244 dated May 12, 2020 (2 pages).
(Continued)

*Primary Examiner* — Matthew W Van Oudenaren
(74) *Attorney, Agent, or Firm* — Michael Best & Friedrich LLP

(57) ABSTRACT

Disclosed is a delivery unit (3) for an anode circuit (9) of a fuel cell system (1) for delivering a gaseous medium, in particular hydrogen, from an anode region (38) of a fuel cell (2), said delivery unit (3) comprising at least one jet pump (4) and being at least indirectly fluidically connected to the outlet of the anode region (38) by means of at least one connection line (23, 25) and being fluidically connected to the inlet of the anode region (38) by means of an additional connection line (27). According to the invention, in addition to the jet pump (4), the delivery unit (3) comprises a recirculation fan (8) and a metering valve (6) as other components, and the flow contours of the components (4, 6,
(Continued)

8) for the gaseous medium and/or the components (4, 6, 8) are at least almost entirely arranged in a common housing (7).

17 Claims, 4 Drawing Sheets

(51) Int. Cl.
| | | |
|---|---|---|
| *F04F 5/14* | (2006.01) | |
| *H01M 8/04111* | (2016.01) | |
| *H01M 8/04119* | (2016.01) | |
| *H01M 8/0438* | (2016.01) | |
| *H01M 8/04746* | (2016.01) | |

(52) U.S. Cl.
CPC ...... *H01M 8/0438* (2013.01); *H01M 8/04111* (2013.01); *H01M 8/04164* (2013.01); *H01M 8/04753* (2013.01); *H01M 8/04761* (2013.01); *H01M 2250/20* (2013.01)

(58) Field of Classification Search
CPC ......... H01M 8/04388; H01M 8/04402; H01M 8/04425; H01M 8/04447; H01M 8/04462; H01M 8/045; H01M 8/04514; H01M 8/04753; H01M 8/04761; H01M 8/04776; H01M 8/04798; H01M 8/04805; H01M 8/2475; H01M 2250/20; B01D 53/24
See application file for complete search history.

(56) References Cited

U.S. PATENT DOCUMENTS

| | | |
|---|---|---|
| 2009/0155102 A1 | 6/2009 | Park et al. |
| 2011/0053013 A1 | 3/2011 | Baur et al. |
| 2011/0189555 A1* | 8/2011 | Baur ................ H01M 8/04037 429/414 |
| 2012/0315559 A1 | 12/2012 | Noh et al. |
| 2014/0329156 A1* | 11/2014 | Mathie ............. H01M 8/04097 429/408 |
| 2015/0318562 A1 | 11/2015 | Hausman et al. |
| 2017/0077532 A1 | 3/2017 | Noh et al. |
| 2017/0309932 A1 | 10/2017 | Kwon et al. |
| 2022/0102742 A1 | 3/2022 | Hero et al. |

FOREIGN PATENT DOCUMENTS

| | | |
|---|---|---|
| DE | 102008058960 A1 | 5/2010 |
| DE | 112009001821 T5 | 6/2011 |
| DE | 102011105710 A1 | 12/2012 |
| DE | 102011114799 A1 | 4/2013 |
| DE | 102012001602 A1 | 8/2013 |
| DE | 102012023828 A1 | 6/2014 |
| DE | 102014105995 A1 | 11/2014 |
| DE | 102017222390 A1 | 6/2019 |
| JP | 2005207395 A | 8/2005 |
| JP | 2005310464 A | 11/2005 |
| JP | 2007115485 A | 5/2007 |
| JP | 2010014092 A | 1/2010 |
| JP | 2010049914 A | 3/2010 |
| JP | 2010267553 A | 11/2010 |
| JP | 2015011974 A | 1/2015 |
| JP | 2015159005 A | 9/2015 |
| JP | 2018092795 A | 6/2018 |
| JP | 2018097993 A | 6/2018 |
| JP | 2018181682 A | 11/2018 |

OTHER PUBLICATIONS

U.S. Patent Office Non-Final Action for U.S. Appl. No. 17/426,717 dated Apr. 27, 2023 (11 pages).
Translation of International Search Report for Application No. PCT/EP2020/050243 dated May 13, 2020 (2 pages).

* cited by examiner

DELIVERY UNIT FOR AN ANODE CIRCUIT OF A FUEL CELL SYSTEM FOR DELIVERING A GASEOUS MEDIUM, AND FUEL CELL SYSTEM

BACKGROUND OF THE INVENTION

The present invention relates to a delivery unit for an anode circuit of a fuel cell system for delivering a gaseous medium, in particular hydrogen, which is provided in particular for use in vehicles with a fuel cell drive. The invention furthermore relates to a fuel cell system having a delivery unit of said type.

In the automotive sector, in addition to liquid fuels, gaseous fuels will also play an increasing role in the future. In particular in the case of vehicles with a fuel cell drive, it is necessary for hydrogen gas flows to be controlled. Here, the gas flows are no longer controlled discontinuously, as in the case of the injection of liquid fuel, but the gas is extracted from at least one high-pressure tank and is conducted via an inflow line of a medium-pressure line system to the delivery unit. Said delivery unit conducts the gas via a connecting line of a low-pressure line system to a fuel cell.

DE 10 2011 105 710 B4 has disclosed a delivery unit for a fuel cell system for delivering and/or recirculating a gaseous medium, having a recirculation blower and having a jet pump which is driven by a motive jet of a pressurized gaseous medium, wherein an anode outlet of a fuel cell is fluidically connected to an inlet of the delivery unit, and wherein an outlet of the delivery unit is fluidically connected to an anode inlet of the fuel cell.

DE 10 2014 105 995 A1 has disclosed a fuel cell system for delivering and/or recirculating a gaseous medium, in the case of which the pressurized gaseous medium is fed to the jet pump by means of a dosing valve.

The delivery unit known from DE 10 2011 105 710 B4 and the fuel cell system known from DE 10 2014 105 995 A1 can each have certain disadvantages. Here, the components of the delivery unit, in particular the recirculation blower and/or the jet pump and/or a dosing valve, are at least in part connected to one another and/or to the fuel cell by means of fluidic connections in the form of pipelines and possibly an additional distributor plate with internally situated channels. Here, the components are present at least in part as separate assemblies which are connected to one another by means of pipelines. Here, on the one hand, numerous flow diversions and thus flow losses arise, in particular in all three dimensions in space. In this way, the efficiency of the delivery unit is reduced. Furthermore, the connection of the components of the delivery unit by means of pipelines is disadvantageous insofar as, over the service life of the delivery unit, in particular in the event of intense temperature fluctuations, the pipelines can lead to leak-tightness problems, in particular in the case of welded pipelines. On the other hand, as a result of the arrangement of the individual components as, at least in part, separate assemblies, there is the disadvantage that, overall, these form a large surface area in relation to the structural space and/or geometrical volume. This promotes rapid cooling of the components recirculation blower and/or jet pump and/or dosing valve, in particular when the vehicle as a whole is at a standstill for long periods of time, which can lead to increased formation of ice bridges and thus increased damage to the components and/or to the fuel cell system as a whole, which in turn can lead to reduced reliability and/or service life of the delivery unit and/or of the fuel cell system. A further disadvantage is furthermore a poor cold-start characteristic of the delivery unit and/or of the fuel cell system and/or of the vehicle as a whole, because heating energy and/or thermal energy must be introduced in each case individually into the components recirculation blower and/or jet pump and/or dosing valve, in particular in the presence of temperatures below 0° Celsius, in order to eliminate possible ice bridges.

SUMMARY OF THE INVENTION

According to the invention, a delivery unit for a fuel cell system is proposed, for delivering and/or recirculating a gaseous medium, in particular hydrogen, wherein the hydrogen will hereinafter be referred to as $H_2$. The invention furthermore relates to a fuel cell system having a delivery unit of said type. Here, the delivery unit comprises at least one recirculation blower, wherein the delivery unit is at least indirectly fluidically connected by means of at least one connecting line to the outlet of an anode region, and wherein the delivery unit is fluidically connected by means of a further connecting line to the inlet of the anode region.

According to the invention, the delivery unit is designed such that the delivery unit has a jet pump and a dosing valve as further components in addition to the component of recirculation blower, wherein the flow contours of the components for the gaseous medium and/or the components recirculation blower, jet pump and dosing valve are arranged at least approximately entirely in a common housing. In this way, the advantage can be achieved that a direct and shortest possible flow line is produced between the components of the delivery unit, in particular between the recirculation blower and/or the jet pump and/or the dosing valve. Furthermore, the number of flow diversions and/or changes in a flow direction of the gaseous medium in the delivery unit can be reduced to as small a number as possible, because the components are positioned in the common housing and thus at a short distance from one another. Here, the inflow openings and the outflow openings of the components recirculation blower and/or jet pump and/or dosing valve are arranged in the common housing relative to one another so as to result in a shortest possible length of the flow connections and the fewest possible flow diversions between the components. Here, the flow contours are situated at least approximately entirely in the common housing, and external pipelines and/or external distributor plates can be at least approximately entirely omitted. It is thus possible, on the one hand, for leaks owing to a leaking pipeline system to be reduced, which reduces the likelihood of failure of the delivery unit and/or fuel cell system. On the other hand, it is thus possible for the friction losses and/or flow losses in the delivery unit and/or fuel cell system to be reduced, whereby the efficiency of the delivery unit and/or of the fuel cell system can be improved.

Furthermore, by means of the arrangement of the flow contours of the components and/or of the components at least approximately entirely in the common housing, it can advantageously be ensured that an overall surface area of the delivery unit, which in particular comprises the components recirculation blower, jet pump and dosing valve, in relation to the structural space and/or geometrical volume can be reduced in size. It is thus possible to achieve the advantage that rapid cooling of the components recirculation blower and/or jet pump and/or dosing valve, in particular when the vehicle as a whole is at a standstill for long periods of time, is prevented, which leads to a reduction and/or prevention of the formation of ice bridges. Here, use is advantageously made of the effect that the components recirculation blower and/or jet pump and/or dosing valve generate heat during operation, for example by way of the electrical actuator arrangement and/or by way of a magnetic actuator arrangement, wherein this heat can be utilized for preventing all of the components in the common housing from cooling down. Furthermore, by means of the arrangement of the components in the common housing, it is possible, with an altogether reduced volume of the delivery unit, to achieve an improved cold-start capability of the delivery unit and/or of the fuel cell system, in particular when the vehicle as a whole is at a standstill for long periods of time, because less mass has to be heated up, and because the available heat of individual components can be utilized in order to heat the common housing. Here, the likelihood of failure of the delivery unit and/or of the fuel cell system can furthermore be reduced, wherein the service life can be increased.

Advantageous refinements of the delivery device according to the invention are possible by means of the measures specified in the subclaims. The subclaims relate to preferred refinements of the invention.

According to one advantageous embodiment, the recirculation blower has a compressor wheel with an encircling outer delimiting ring which runs rotationally symmetrically with respect to an axis of rotation of the compressor wheel, and wherein an at least partially encapsulated separation space, and/or a discharge channel, is situated in the housing of the delivery unit on that side of the compressor wheel which is averted from the axis of rotation. Furthermore, the constituent $H_2O$ and/or the constituent $N_2$ of the gaseous medium is separated off in the recirculation blower, wherein the separation is performed in particular by means of the centrifugal principle in the recirculation blower. In this way, it is possible on the one hand to achieve the advantage that an at least partial encapsulation of the at least one side channel and/or of a delivery cell with respect to an outer region in the housing, in particular with respect to the separation space, is realized. The efficiency of the recirculation blower and thus of the delivery unit can thus be improved. On the other hand, the advantage can be achieved that the heavy constituents can be discharged from a compressor space of the recirculation blower into the separation space, which is situated in particular between the outer delimiting ring of the compressor wheel and the housing, and/or can be discharged further out of the housing of the recirculation blower and the fuel cell system. This offers the advantage that an increase in the efficiency of the recirculation blower and/or of the fuel cell system can be maintained over the entire service life, because the fraction and/or the concentration of $H_2$ in the gaseous medium can be increased, whereas the fraction and/or the concentration of the heavy constituent, in particular $H_2O$ and/or $N_2$, in the gaseous medium can be reduced. Furthermore, the advantage is achieved that, as a result of the heavy constituents being conducted out of the region of the compressor space, a formation of so-called ice bridges between the moving parts, in particular the compressor wheel and the housing, in the shut-down state of the fuel cell system and in particular in the presence of low ambient temperatures is prevented. Such ice bridges would impede, or entirely prevent, starting of the fuel cell system, in particular of the recirculation blower. It is thus possible for damage to the rotating parts of the recirculation blower, and/or of a drive, in particular of an electric drive, owing to ice bridge formation to be prevented by means of the embodiment according to the invention of the recirculation blower. This leads to increased reliability of the fuel cell system and/or of the vehicle. Through the use of the centrifugal principle for discharging the heavy constituents, the advantage can be achieved that the separation process is improved such that the constituents $H_2O$ and/or $N_2$ can be separated off virtually entirely from the medium, in particular from $H_2$. It can thus be ensured that the greatest possible fraction of $H_2$ flows back to the fuel cell, whereby, on the one hand, the efficiency and/or the power of a fuel cell can be increased. Furthermore, the advantage can be achieved that, for the separation of the constituents $H_2O$ and/or $N_2$ from the constituent $H_2$, no additional energy and/or only a small amount of energy has to be provided, in particular by the fuel cell system and/or by the superordinate vehicle system. A further introduction of energy, in particular of kinetic energy, into the medium is thus no longer necessary in order to be able to achieve optimum efficiency of the separation process by the recirculation blower by means of the centrifugal principle. In this way, the efficiency of the fuel cell system can be increased, and the operating costs can be reduced.

According to one advantageous embodiment of the delivery unit, the recirculation blower and the jet pump are arranged relative to one another in the common housing such that the axis of rotation of the compressor wheel of the recirculation blower runs at least approximately perpendicular to a longitudinal axis of the jet pump. Furthermore, a gas outlet opening of the recirculation blower transitions directly into a first inflow line and/or an intake region of the jet pump and, in so doing, forms an integrated flow channel. Furthermore, the integrated flow channel may form a curvature within the common housing, wherein a diversion and/or flow guidance of the gaseous medium between the recirculation blower and the jet pump takes place exclusively in the region of the curvature. This offers the advantage that the flow losses and/or pressure losses within the delivery unit can be reduced owing to the length of the flow lines and/or the number of flow diversions. It is furthermore advantageous that the flow guidance in the recirculation blower and in the jet pump takes place in parallel planes, wherein this advantageous effect can be improved through the fact that the gaseous medium, when it flows out of the recirculation blower, whereupon the gaseous medium has swirl energy imparted to it in particular in the recirculation blower, is introduced via the region of the curvature into the intake region of the jet pump in an advantageous manner such that a transfer of momentum and/or jet pump effect in this region, and/or in the region of a mixing pipe of the jet pump, can be improved. Furthermore, a flow diversion of the gaseous medium is furthermore reduced, whereby the flow losses within the delivery unit can be further reduced. The geometrical form of the integrated flow channel in the region of the curvature is in this case of friction-reducing configuration. In this way, the efficiency of the delivery unit can be improved, in particular at virtually all operating points and/or in the presence of virtually all pressure conditions of the fuel cell system, and the energy expenditure for the operation of the delivery unit can be reduced. Furthermore, by means of the arrangement of the components recirculation blower and jet pump relative to one another, a compact structural form of the delivery unit can be realized, such that the advantage can be achieved that the delivery unit requires less structural space, in particular in the overall vehicle.

Furthermore, by means of the embodiment according to the invention of the delivery unit, the required number of components for the assembly of the delivery unit can be reduced, which in turn leads to a saving of costs for the delivery unit. Furthermore, the likelihood of assembly errors owing to components of the delivery unit being oriented incorrectly relative to one another is reduced, which in turn reduces the likelihood of failure of the delivery unit during operation.

According to one particularly advantageous embodiment of the fuel cell system, a separation of the constituent $H_2O$ and/or of the constituent $N_2$ from the gaseous medium in an anode circuit is performed by means of the recirculation blower and/or by means of a separator. It can thus advantageously be ensured that an early and rapid separation of the heavy constituents $H_2O$ and/or $N_2$ can be effected, whereby the efficiency of the fuel cell system is increased, because the heavy constituents only have to be concomitantly delivered through the anode circuit over the shortest possible distance; such delivery would result in a reduction in efficiency because, for the fraction of heavy constituents in the gaseous medium, less $H_2$ can be delivered, and because the heavy constituents have a greater mass. Furthermore, in one exemplary embodiment of the fuel cell system, in the case of which the recirculation blower and the separator are used for separating and/or discharging the heavy constituents out of the anode circuit, a cumulative effect can be generated, in particular if the two components are connected in series. In this way, the efficiency of the fuel cell system can be further increased.

According to one advantageous embodiment of the fuel cell system, the separator is arranged in the anode circuit upstream of the delivery unit in a flow direction V, wherein the anode region is fluidically connected to the separator by means of a first connecting line, and the separator is fluidically connected to the delivery unit by means of a second connecting line, and the delivery unit is fluidically connected to the anode region by means of a third connecting line. Furthermore, a discharge of $H_2O$ and/or $N_2$ from the recirculation blower into the separator can take place in a flow direction VI. Here, the separation space and/or the discharge channel, which are each situated in the housing of the delivery unit on that side of the compressor wheel which is averted from an axis of rotation and are at least partially encapsulated, are at least indirectly fluidically connected to a collecting vessel of the separator via the return line. Furthermore, the separation space and/or the discharge channel form an elevated pressure level in relation to the collecting vessel of the separator, wherein a discharge of $H_2O$ and/or $N_2$ from the recirculation blower into the separator takes place in the flow direction VI. In this way, the elevated pressure level and/or the centrifugal force to which the gaseous medium is subjected from the rotational movement in the recirculation blower can be utilized in order to effect an improved discharge of the heavy constituents $H_2O$ and/or $N_2$ from the separation space via the discharge channel and/or the return line into the collecting vessel of the separator. Here, the pressure gradient, in the case of which, in particular, a higher pressure prevails in the separation space than in the collecting vessel, is utilized in order to discharge the heavy constituents from the delivery unit into the collecting vessel of the separator via the discharge channel and/or the return line. Furthermore, by means of the return line and/or the above-described pressure gradient between the separation space and collecting vessel, it is possible for the process whereby the $H_2$ situated in the collecting vessel is delivered back into the anode circuit, in particular via the second connecting line, to be improved. It is thus possible, through the use and the respective arrangement of the water separator, to achieve the advantage that the efficiency of the delivery unit and/or of the fuel cell system can be increased.

Furthermore, by means of the direct connection of the delivery unit to the separator by means of the return line, an increase in the degree of water separation out of the delivery unit can be realized, such that, even when the vehicle as a whole is at a standstill for long periods of time, and in the presence of low temperatures, in particular below 0° C., the water in the delivery unit cannot form any ice bridges that can damage the delivery unit and/or the fuel cell system, in particular a membrane. Furthermore, the embodiment according to the invention of the fuel cell system eliminates the need for a purge valve, which is situated in particular at the delivery unit and which serves for the drainage of $H_2O$ and/or $N_2$, such that fewer pressure losses and/or losses of $H_2$ from the anode circuit occur, and furthermore fewer components are required, such that the material costs and/or the production costs of the fuel cell system as a whole can be lowered.

According to one advantageous refinement of the fuel cell system, the collecting vessel has a discharge valve, wherein the discharge valve is arranged in the collecting vessel at a geodetic height that is low during intended use, wherein the discharge of all of the $H_2O$ and/or $N_2$ out of the region of the anode circuit takes place via the discharge valve. Here, the second connecting line is arranged at a high geodetic height in the collecting vessel. It is thus advantageously ensured that, utilizing gravitational force, the heavy constituents, in particular $H_2O$ and/or $N_2$, of the gaseous medium, which are separated off from the rest of the gaseous medium inter alia in the collecting vessel of the separator, collect in the region of low geodetic height close to the discharge valve. Here, the heavy constituents can then be discharged from the separator and thus from the anode circuit via the discharge valve and onward via an outflow line, wherein at least approximately no $H_2$ is concomitantly discharged and thus lost for the production of energy by means of the fuel cell system. It is furthermore advantageously ensured that, utilizing gravitational force, the lightweight constituent of the gaseous medium, in particular $H_2$, which is separated off from the rest of the gaseous medium inter alia in the collecting vessel of the separator, collects in the region of the high geodetic height, in particular close to the second collecting line. Here, the lightweight constituents can then be discharged from the collecting vessel of the separator and introduced into the second connecting line of the anode circuit. The efficiency of the fuel cell system can thus be improved.

According to one particularly advantageous embodiment of the fuel cell system, a separating edge is arranged in the collecting vessel such that the inflowing gaseous medium passing from the anode region is diverted and/or split up such that the lightweight constituent $H_2$ is diverted in the direction of the second connecting line, and the heavy constituents $H_2O$ and/or $N_2$ are diverted in the direction of a reservoir. This has the advantage that a separation and a discharge of the heavy constituent from the lightweight constituents can be achieved in the separator, in particular in the collecting vessel, wherein the efficiency of the fuel cell system can be improved. Furthermore, by means of the separating edge, the advantage can be achieved that the lightweight constituent $H_2$ is conducted to a high geodetic height of the collecting vessel, whereas the heavy constituents $H_2O$ and/or $N_2$ are conducted into the region of a low geodetic height, wherein the separation process by means of the separating edge is intensified by the pressure prevailing in the first connecting line and a flow speed of the gaseous medium which flows from the first connecting line into the collecting vessel and which impinges on the separating edge. The flow loss and/or the pressure loss in the separator thus remains low, and the efficiency of the fuel cell system can be improved.

In one particularly advantageous refinement, the return line has a shut-off valve, wherein the shut-off valve is situated between the recirculation blower and the separator, in particular the collecting vessel. Here, a first sensor arrangement and/or a second sensor arrangement are connected to a control device, wherein, in particular, the first sensor arrangement continuously detects parameters of the separator and the second sensor arrangement continuously detects parameters of the recirculation blower. Here, the control device controls the opening and closing of the discharge valve and/or of the shut-off valve in particular on the basis of the parameters detected by the respective sensor arrangement. In this way, the advantage can be achieved that, by means of the actuation, in particular the opening and closing, of the discharge valve and/or of the shut-off valve on the basis of the data detected by the sensor arrangement, the heavy constituents can be discharged out of the anode circuit of the fuel cell system and/or the separation space as far as possible whenever a certain concentration of heavy constituents in the gaseous medium is detected by means of the sensor arrangement, and/or if a certain pressure level and/or temperature level is detected and/or overshot in various regions of the fuel cell system. Furthermore, a possibly prevailing pressure gradient and/or a flow and/or a mass flow out of the anode circuit, in particular the delivery unit and/or the recirculation blower and/or the first connecting line and/or the second connecting line, can be utilized to discharge the heavy constituents out of the anode circuit in the most efficient manner possible and at least approximately without additional expenditure of energy, or to effect a corresponding separation. The efficiency of the fuel cell system can be increased in this way.

The invention is not restricted to the exemplary embodiments described here and to the aspects highlighted therein. Rather, within the scope specified by the claims, a large number of modifications and/or combinations of the features and/or advantages described in the claims are possible which lie within the abilities of a person skilled in the art.

BRIEF DESCRIPTION OF THE DRAWINGS

The invention will be described in more detail below on the basis of the drawing.

In the drawing.

DETAILED DESCRIPTION

Figure 1:
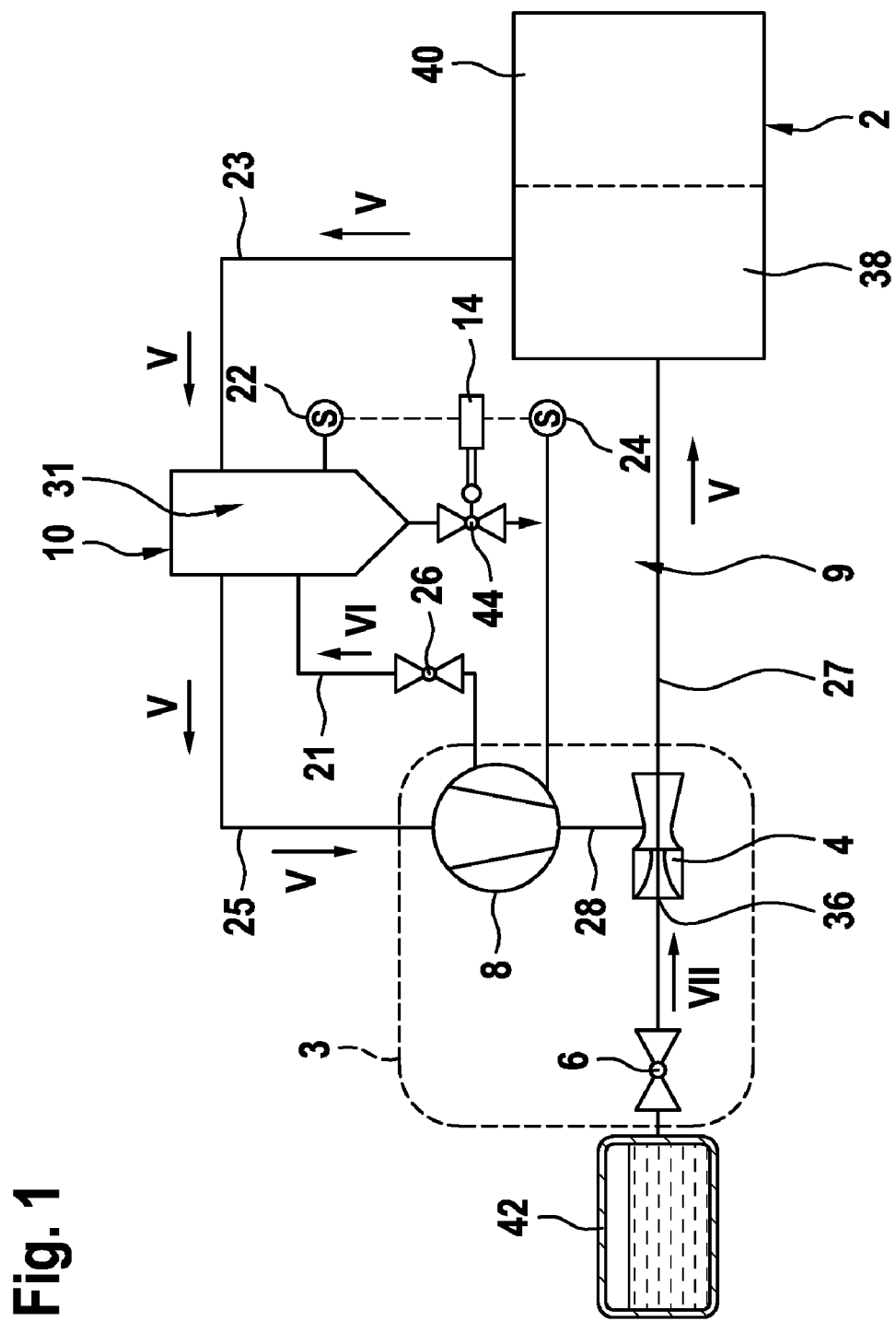
FIG. 1 is a schematic illustration of a fuel cell system according to the invention with a delivery unit and a separator.

FIG. 1 is a schematic illustration of a fuel cell system according to the invention with a delivery unit 3 and a separator 10.

Here, it is shown in FIG. 1 that the fuel cell system 1 has a fuel cell 2, wherein the fuel cell 2 has an anode region 38 and a cathode region 40. Here, the anode region 38 of the fuel cell 2 is connected to an anode circuit 9, wherein the anode circuit 9 has the separator 10, the delivery unit 3 and a tank 42. Here, the separator 10 is arranged in the anode circuit 9 upstream of the delivery unit 3 in a flow direction V, wherein the anode region 38 is fluidically connected to the separator 10 by means of a first connecting line 23, and the separator 10 is fluidically connected to the delivery unit 3 by means of a second connecting line 25, and the delivery unit 3 is fluidically connected to the anode region 38 by means of a third connecting line 27. The delivery unit 3 furthermore has a recirculation blower 8, a jet pump 4 and a dosing valve 6, wherein the dosing valve 6 is situated between the tank 42 and the jet pump 4. In one exemplary embodiment, the dosing valve 6 is connected at least approximately directly to the jet pump 4, wherein an external pipeline between the two components is either not provided, because the dosing valve 6 is formed in an integrated manner in the jet pump 4, or the external pipeline is designed to be as short as possible in order to prevent flow losses through the pipeline.

Here, the recirculation blower 8 of the delivery unit 3 delivers an unconsumed recirculate, passing from the fuel cell 2, into the jet pump 4 via a first inflow line 28. Furthermore, pressurized $H_2$, which is in particular a motive medium, is fed in a flow direction VII to the jet pump 4 by means of the dosing valve 6 and flows into the jet pump 4 via a second inflow line 36. Furthermore, a separation of the constituent $H_2O$ and/or of the constituent $N_2$ from the gaseous medium in the anode circuit 9 is performed by means of the recirculation blower 8 and/or by means of the separator 10. Here, the recirculation blower 8 is connected to the separator 10 by means of a return line 21. Here, a discharge of $H_2O$ and/or $N_2$ from the recirculation blower 8 into the separator 10 may take place in a flow direction VI. Furthermore, the return line 21 has a shut-off valve 26, wherein the shut-off valve 26 is situated between the recirculation blower 8 and the separator 10, in particular a collecting vessel 31 of the separator 10. Furthermore, at the collecting vessel 31 of the separator, there is situated a discharge valve 44, by means of which the heavy constituents $H_2O$ and/or $N_2$ that have been separated off from the gaseous medium can be discharged from the anode circuit 9 and/or from the fuel cell system 1.

Furthermore, it is shown in FIG. 1 that a first sensor arrangement 22 and/or a second sensor arrangement 24 are connected to a control device 14, wherein, in particular, the first sensor arrangement 22 continuously detects parameters of the separator 10 and the second sensor arrangement 24 continuously detects parameters of the recirculation blower 8, wherein the control device 14 controls the opening and closing of the discharge valve 44 and/or of the shut-off valve 26 in particular on the basis of the parameters detected by the sensor arrangement 22, 24. Here, the detected parameters may for example be pressure, temperature, volume flow, concentration of different constituents of the gaseous medium, such as for example $H_2$, $H_2O$, $N_2$ and/or dirt particles. Here, the sensor arrangement 22, 24 may for example also be installed directly on the delivery unit 3. By means of a corresponding logic or calculation method stored on the control device 14, for example in the form of a CPU with a memory unit, a corresponding actuation and/or opening and/or closing of the valve 26, 44 can take place on the basis of the detected data such that an optimum discharge of the heavy constituents out of the anode circuit 9 and/or fuel cell system 1 can be performed, wherein the lightweight constituent $H_2$ can be returned in the greatest possible quantity back into the anode circuit 9.

Figure 2:
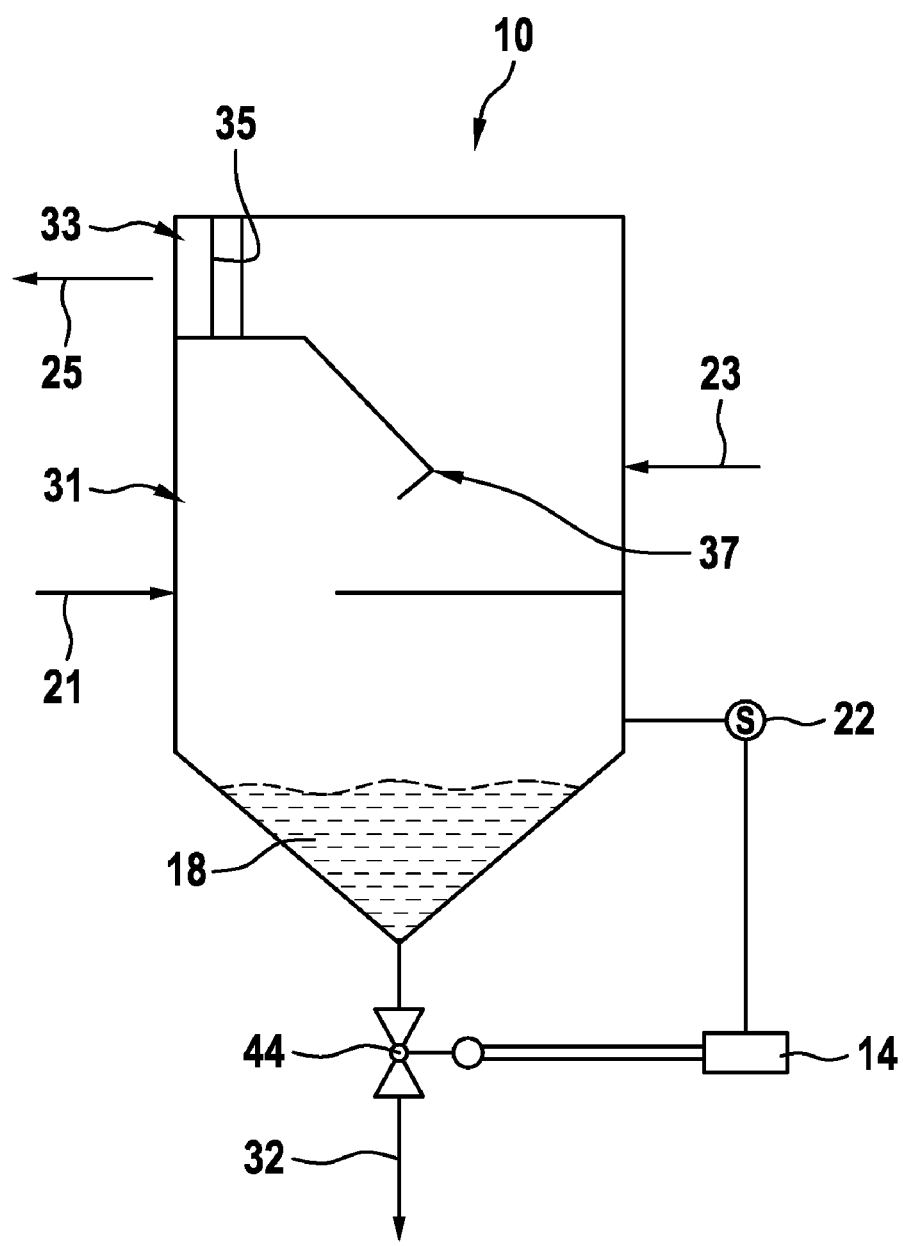
FIG. 2 shows a schematic sectional view of the separator according to the invention.

FIG. 2 shows a schematic sectional view of the separator 10 according to the invention. Here, the separator 10 has the collecting vessel 31, wherein the collecting vessel 31 is connected by means of the return line 21 and/or the first connecting line 23 and/or the second connecting line 25 to the anode circuit 9 of the fuel cell system 1 and/or various components of the fuel cell system 1, such as the recirculation blower 8. Furthermore, the collecting vessel 31 has the discharge valve 44 and/or an outflow line 32 by means of which the heavy constituents, in particular $H_2O$ and/or $N_2$, can be discharged into the environment or returned into the cathode circuit of the fuel cell system 1. Here, the discharge valve 44 and/or the outflow line 32 is arranged for example at a low geodetic height in the collecting vessel 31, in particular in order for the heavy constituents to be conducted into and/or collected in said region of the collecting vessel 31 by means of gravitational force. Here, all of the $H_2O$ and/or $N_2$ can be discharged out of the region of the anode circuit 9 via the discharge valve 44. The region of the low geodetic height in the collecting vessel 31 is referred to here as reservoir 18. Above the reservoir 18, on that side of the reservoir 18 which is averted from the discharge valve 44, there may be situated at least one wall which serves as an overflow guard of the reservoir 18. Here, by contrast, the second connecting line 25 may be arranged on the opposite side of the collecting vessel 31, for example at a high geodetic height of the collecting vessel 31.

It is furthermore shown in FIG. 2 that a separating edge 37 is arranged in the collecting vessel 31 such that the inflowing gaseous medium, which passes from the anode region 38 and which flows in via the first connecting line, and which is in particular a recirculate, is diverted and/or split up such that the lightweight constituent $H_2$ is diverted in the direction of the second connecting line 25, and the heavy constituents $H_2O$ and/or $N_2$ are diverted in the direction of a reservoir 18. Here, the effect of gravitational force on the gaseous medium is utilized, by means of which the lightweight constituents are diverted into an upper region of the separating edge 37, in particular on that side of the separating edge 37 which faces toward the second connecting line 25, and wherein the heavy constituents, owing to their greater mass, are diverted into a lower region of the separating edge 37, in particular on that side of the separating edge 37 which faces toward the reservoir 18. The splitting of the lightweight constituents from the heavy constituents is accelerated by means of the separating edge 37, because the respective constituents undergo a diversion in each case into a region of high geodetic height or into a region of low geodetic height in the collecting vessel 31. It is furthermore shown that, in one exemplary embodiment, a membrane space 33 is situated in the region of the high geodetic height in the collecting vessel 31, in particular in the region in which the collecting vessel 31 is fluidically connected to the second connecting line 25. Here, the membrane space 33 has, in particular, a membrane insert 35. The membrane insert 35 is in this case in the form of a semipermeable membrane, wherein the lightweight constituent $H_2$ of the medium can pass through the membrane, whereas it is not possible for the constituents $H_2O$ and/or $N_2$ to pass through the membrane, in particular owing to the molecule size. Here, the gaseous medium that is intended to pass from the collecting vessel 31 into the second connecting line 25 must pass through the membrane space 33 and/or the membrane insert 35 and/or the membrane. Furthermore, owing to the embodiment according to the invention of the separator 10, the advantage can be achieved that a stratification of the constituents of the gaseous medium in the collecting vessel 31 is achieved through the utilization of gravitational force.

It is furthermore shown in FIG. 2 that the separator 10 has the first sensor arrangement 22, wherein the first sensor arrangement 22 continuously detects parameters from the collecting vessel 31, wherein the first sensor arrangement 22 and/or the control device 14 evaluates and/or processes the detected data and/or computationally evaluates said data by means of a CPU, and wherein the discharge valve 44 is actuated by means of the control device 14. In a further exemplary embodiment, the sensor arrangement 22 may also detect the filling level of the separator 10 in the region of the reservoir 18 and use these detected data for the evaluation, in particular by means of the CPU and/or the control device 14, such that, for example, the discharge valve 44 is actuated when a certain filling level is overshot, and thus the reservoir 18 is emptied. The actuation of the discharge valve 44 by means of the control device 14 may in this case be performed mechanically and/or electrically and/or electronically and/or in some other way, wherein a complete and/or partial opening or closing of the discharge valve 44 is possible. This type of actuation furthermore applies to the shut-off valve 26 (not shown in FIG. 2) and the second sensor arrangement 24 by means of the control device 14 in a similar and/or congruent manner.

Figure 3:
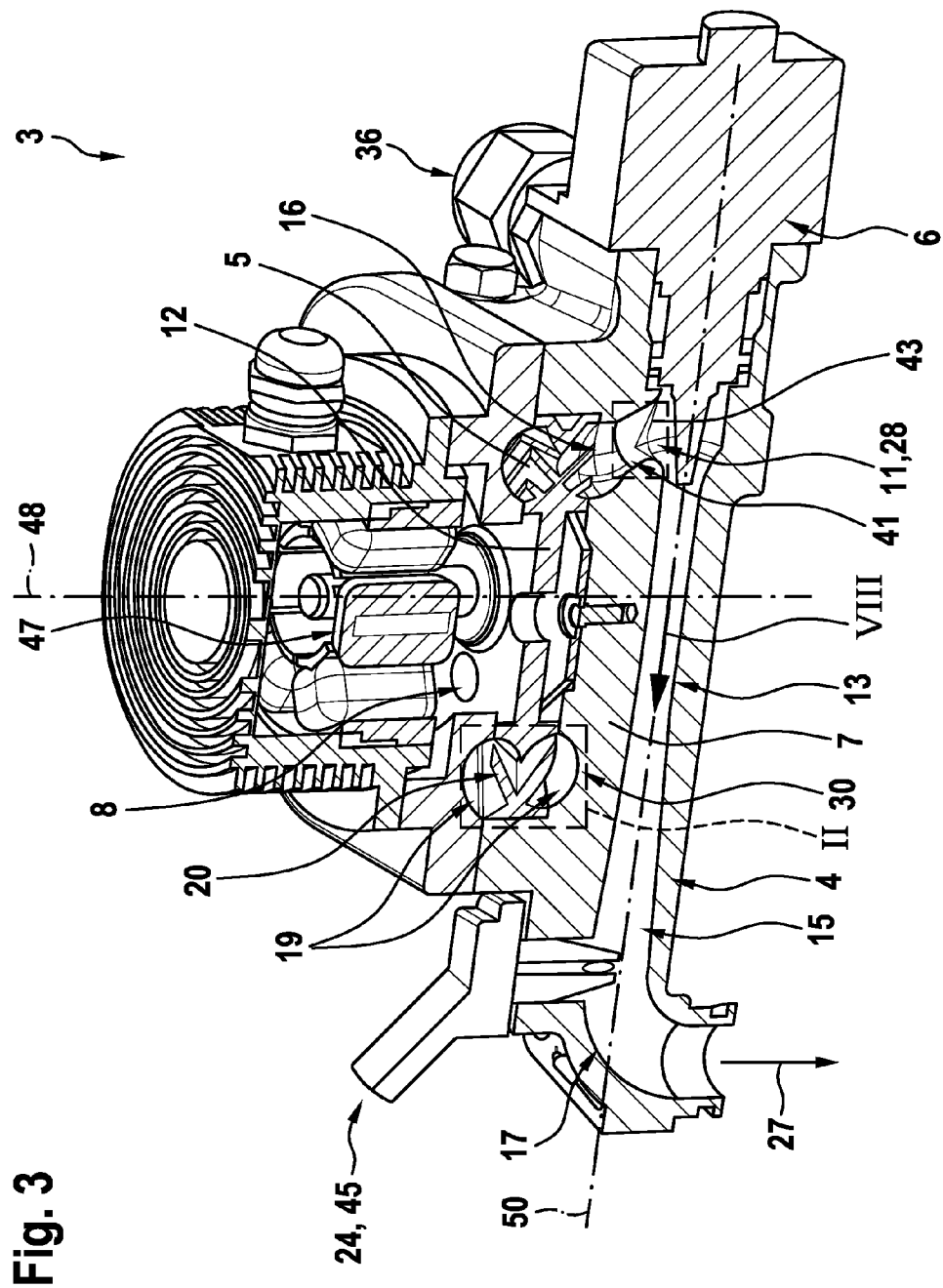
FIG. 3 shows a perspective sectional view of the delivery unit with a recirculation blower, a jet pump and a dosing valve in a housing.

FIG. 3 shows a perspective sectional view of the delivery unit 3 with the recirculation blower 8, the jet pump 4 and the dosing valve 6. Here, it is shown that the delivery unit 3 has the recirculation blower 8 and the dosing valve 6 as further components in addition to the component of jet pump 4, wherein the flow contours of the components 4, 6, 8 for the gaseous medium and/or the components 4, 6, 8 are arranged at least approximately entirely in a common housing 7. Here, in one exemplary embodiment, the housing may be formed in two parts, three parts or more parts. Here, the individual parts are in particular composed of the same material, and/or have an at least approximately equal coefficient of thermal expansion. Here, the recirculation blower 8 has a drive 47, in particular an electric drive 47, which, by means of a drive shaft, is at least cardanically connected to a compressor wheel 12 which is rotatable about an axis of rotation 48. When a torque is transmitted from the drive 47 to the compressor wheel 12, the compressor wheel 12 is set in rotational motion, and the at least one delivery cell 20 moves, in circulating fashion about the axis of rotation 48, through a compressor space 30 in the housing 7. Here, in each case always one of the delivery cells 20 is arranged between two blades 5 of the compressor wheel 12. Here, a gaseous medium already situated in the compressor space 30 is moved concomitantly, and in the process delivered and/or compressed, by the at least one delivery cell 20. Furthermore, a movement of the gaseous medium, in particular a flow exchange, takes place between the at least one delivery cell 20 and the at least one side channel 19. Here, for the delivery action, it is crucial that, during operation, a circulating flow can form within the at least one side channel 19.

By means of the second inflow line 36, a pressurized motive medium is fed to the dosing valve 6, which motive medium is fed via a nozzle to an intake region 11 by means of opening and closing of the dosing valve 6 and, there, merges with the recirculate passing from the recirculation blower 8. Here, the jet pump 4, in a flow direction VIII that runs in particular along its longitudinal axis 50, has the intake region 11, a mixing pipe 13 and a conically running diffuser region 15 and an outlet manifold 17, wherein the latter is connected to the third connecting line 27. Here, a so-called jet pump effect occurs within the jet pump 4. For this purpose, the gaseous motive medium, in particular $H_2$, flows into the dosing valve 6 from the outside, in particular from the tank 42, through the second inflow line 36. The motive medium is then introduced, in particular at high pressure, into the intake region 11 by means of an opening of the dosing valve 6. Here, the gaseous motive medium flows in the direction of the flow direction VIII. The $H_2$ which flows from the second inflow line 36 into the intake region 11 and which serves as motive medium has a pressure difference in relation to the recirculation medium that flows from the first inflow line 28 into the intake region 11, wherein the motive medium is in particular at a relatively high pressure of at least 10 bar. In order that the jet pump effect occurs, the recirculation medium is delivered with a low pressure and a small mass flow into the intake region 11 of the jet pump 4. Here, the motive medium flows with the described pressure difference and a high speed, which is in particular close to the speed of sound, through the dosing valve 6 into the intake region 11. Here, the motive medium impinges on the recirculation medium that is already situated in the intake region 11. Owing to the high speed and/or pressure difference between the motive medium and the recirculation medium, internal friction and turbulence are generated between the media. Here, a shear stress arises in the boundary layer between the fast motive medium and the much slower recirculation medium. This stress gives rise to a transfer of momentum, wherein the recirculation medium is accelerated and entrained. The mixing occurs in accordance with the principle of conservation of momentum. Here, the recirculation medium is accelerated in the flow direction VI and a pressure drop also occurs for the recirculation medium, whereby a suction effect occurs and thus a follow-up delivery of further recirculation medium out of the region of the first inflow line 28 and/or of the recirculation blower occurs. By means of a change and/or regulation of the opening duration and of the opening frequency of the dosing valve 6, a delivery rate of the recirculation medium can be regulated and adapted to the respective requirement of the fuel cell system 1 as a whole in a manner dependent on the operating state and operating requirements.

It is furthermore shown in FIG. 3 that the components 4, 6, 8 of the delivery unit 3 are each arranged in a compact manner with respect to one another in the housing 7. Here, the recirculation blower 8 and the jet pump 4 are arranged relative to one another in the common housing 7 such that the axis of rotation 48 of the compressor wheel 12 of the recirculation blower 8 runs at least approximately perpendicular to the longitudinal axis 50 of the jet pump 4. In this way, it is possible on the one hand for the surface area of the delivery unit 3 and/or the required structural space in the vehicle to be reduced. On the other hand, the flow contours of the components 4, 6, 8 can be arranged in a space-saving manner with respect to one another such that, for example, a gas outlet opening 16 of the recirculation blower 8 can flow approximately directly into the intake region 11 and/or the first inflow line 28 of the jet pump 4, in particular via an integrated flow channel 41 which is optimized in terms of flow and which has a curvature 43, wherein a diversion and/or flow guidance of the gaseous medium between the recirculation blower 8 and the jet pump 4 takes place exclusively in the region of the curvature 43. It is thus the case that at least approximately no additional pipelines are required for connecting the components 4, 6, 8. Furthermore, the second sensor 24 and/or a low-pressure sensor 45 are arranged in a space-saving and/or integrated manner in the housing 7, whereby less structural space is required.

The drive 47, which is composed in particular of a thermally conductive material, can be advantageously warmed up, which is advantageous in particular during a cold-start procedure of the delivery unit 3 and/or of the vehicle. Here, the drive 47 warms up and, for example owing to its thermal conductivity, transfers the thermal energy to the compressor wheel 12 and further components of the delivery unit 3 and/or the housing 7. Upon a shutdown of the delivery unit 3 and/or of the vehicle, in particular over a relatively long period of time and/or in the presence of low ambient temperatures below the freezing point, the liquid freezes, and ice bridges form. These ice bridges can, upon a start-up and/or upon starting and/or during operation, lead to damage to the delivery unit 3 and/or of the fuel cell system 1. As a result of the heating of the drive 47, the ice bridges melt, and the liquid changes from a solid to a liquid state of aggregation and can be discharged. Here, the arrangement of the drive 47 is such that the introduction of heat into the housing 7 takes place as quickly and efficiently as possible. Here, a specific form of the integrated housing, and the use of composite material for the housing, can lead to improved thermal conductivity. Alternatively, in one exemplary embodiment, the use of thermal effects from the fuel cell 2, in particular a stack, can be used for warming or cooling the integrated housing 7. Furthermore, the actuator arrangement of the dosing valve 6 can be used as heat source, and advantageously acts similarly to the drive 47.

Figure 4:
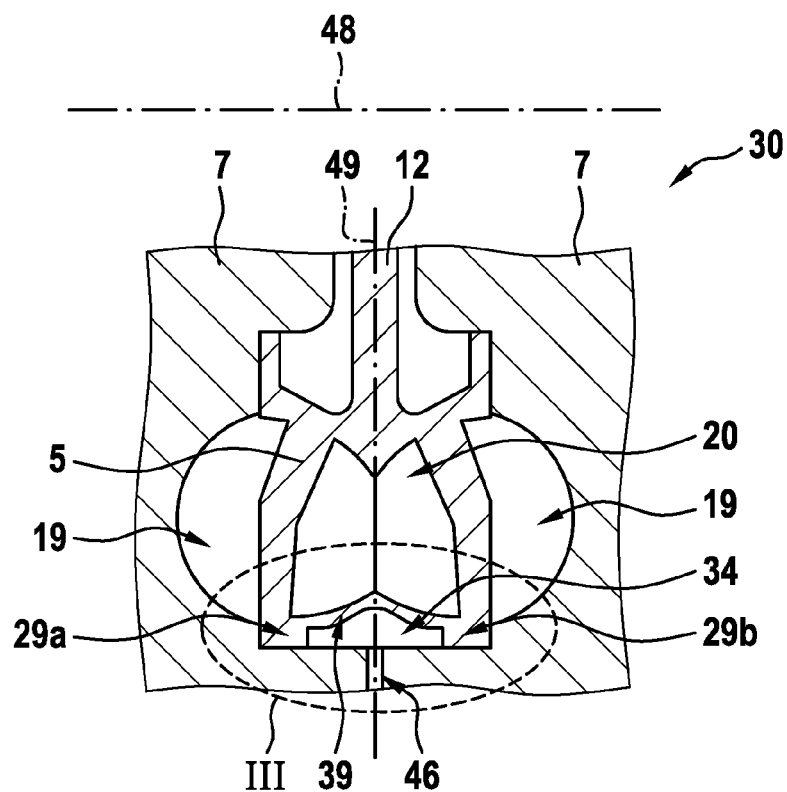
FIG. 4 shows a detail, denoted by II in FIG. 3, of a compressor space of the recirculation blower.

FIG. 4 shows a detail, denoted by II in FIG. 3, of the compressor space 30 of the recirculation blower 8 with the compressor wheel 12. It is shown here that the compressor wheel 12 has an encircling outer delimiting ring 39 which runs rotationally symmetrically with respect to the axis of rotation 48 of the compressor wheel 12. Here, a separation space 34 which is at least partially encapsulated, in particular with respect to the at least one side channel 19, and/or a discharge channel 46, is situated in the housing 7 of the recirculation blower and/or of the delivery unit 3 on that side of the compressor wheel 12 which is averted from the axis of rotation 48. The compressor wheel 12 is furthermore of symmetrical construction in relation to an axis of symmetry 49, wherein the axis of symmetry 49 runs orthogonally with respect to the axis of rotation 48. Furthermore, the trailing contour of a blade 5 of the compressor wheel 12 is shown, wherein this contour is merged in another section along the axis of symmetry 49.

Here, the compressor wheel 12 is shown, which, in the region of the outer delimiting ring 39, has at least one externally situated encircling annular collar 29a, b. Said externally situated annular collar 29a, b runs axially in relation to the axis of symmetry 49 and on that side of the outer delimiting ring 39 which is averted from the axis of rotation 48. Here, the at least one externally situated annular collar 29a, b is, axially and/or radially in relation to the axis of symmetry 49, at least approximately in contact with the housing upper part 7 and/or the housing lower part 8 of the housing 7 and/or forms a small gap therewith, which at least approximately cannot be overcome by the gaseous medium. By virtue of the fact that a small gap can form between the compressor wheel 12 with the at least one externally situated encircling annular collar 29a, b and the housing 7, an at least partial encapsulation of the at least one side channel 19 with respect to the separation space 34 can be realized.

It is furthermore illustrated in FIG. 4 that the separation space 34 is formed, at least partially in encircling fashion about the axis of rotation 48, between the housing 7 and the outer delimiting ring 39. The heavy constituents are thus discharged out of the region of the at least one side channel 19 and of the delivery cell 20 and collected in the region of the separation space 34. These heavy constituents of the gaseous medium may for example be an undesired waste product and/or by-products from the operation of the fuel cell system 1. As a result of the discharge of the heavy constituents, the delivery and compression action of the delivery unit 3 can be increased, because the fraction of the gaseous medium to be delivered, in particular $H_2$, which is required for the generation of electricity in the fuel cell 2, in the delivery cell 20 and the at least one side channel 19 is increased. In this way, the efficiency of the delivery unit 3 can be increased, because no heavy constituents, which are undesired for operation, have to be delivered concomitantly.

Figure 5:
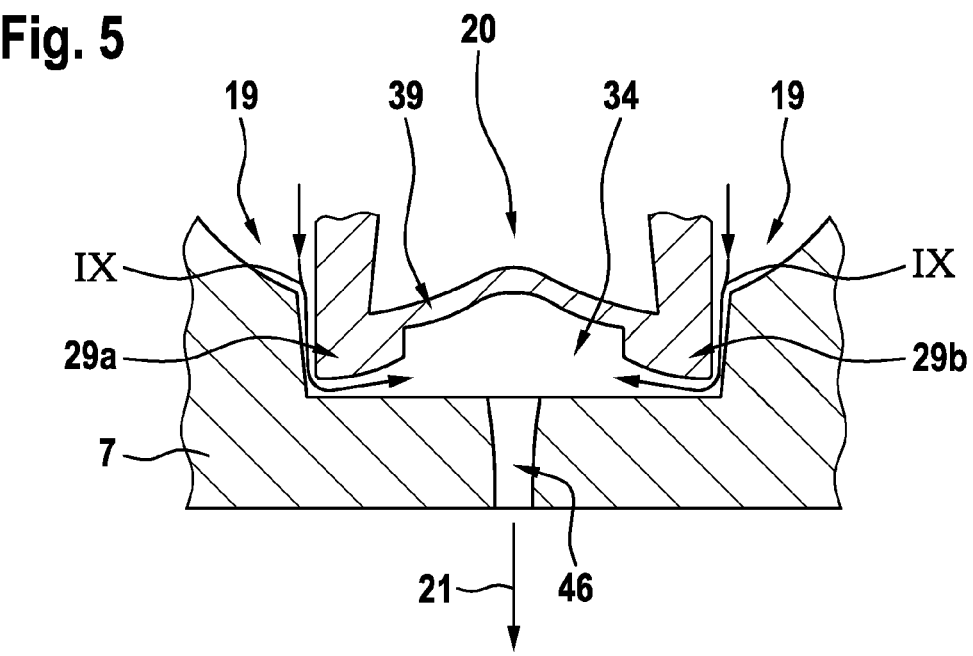
FIG. 5 shows a detail, denoted by III in FIG. 4, of a separation space.

FIG. 5 shows the detail of the separation space 34 that is denoted by III in FIG. 4. It is illustrated here that the constituent $H_2O$ and/or the constituent $N_2$ is separated off from the gaseous medium in the recirculation blower 8, wherein the separation takes place in particular by means of the centrifugal principle in the recirculation blower 8. It is shown here that the separation space 34 is at least indirectly fluidically connected via the discharge channel 46 to the recirculation line 21, wherein the recirculation line 21 fluidically connects the delivery unit 3 and/or the recirculation blower 8 at least indirectly to the collecting vessel 31 of the separator 10. Here, the separation space 34 and/or the discharge channel 46 can form an elevated pressure level in relation to the collecting vessel 31 of the separator 10, and wherein a discharge of $H_2O$ and/or $N_2$ from the recirculation blower 8 into the separator 10 takes place in the flow direction VI.

Through the formation of this separation space 34, it is possible for the heavy constituents to be discharged from the gaseous medium, in particular $N_2$ and/or $H_2O$, and collected in said separation space 34. Here, a rotation of the compressor wheel 12 during operation is advantageously utilized to utilize a greater centrifugal force of the heavy constituents owing to the higher mass in relation to the rest of the gaseous medium, in particular $H_2$, to achieve that the heavy constituents are moved away from the axis of rotation 48 by means of the centrifugal force with such intensity that they move in a flow direction IX from the at least one side channel 19 between the compressor wheel 12 and the housing 7, in particular in the region of the small gap, into the separation space 34, wherein a separation based on centrifugal force occurs. The additional discharge channel 46 is advantageously situated at the geodetic lowest point of the separation space 34. It is advantageous here that, by means of the action of gravitational force and/or centrifugal force on the heavy constituents of the gaseous medium that have collected in the separation space 34, an automatic discharge through the discharge channel 46 into the return line 21 occurs without the need for further measures, for example mechanical pumped discharge. Furthermore, the effect of the automatic discharge of the heavy constituents through the discharge channel 46 to the outside is intensified in that, during the operation of the recirculation blower 8, heavy constituents continue to flow into the separation space 34 and thus force the heavy constituents already situated there out through the discharge channel 46.

This furthermore offers the advantage that the heavy constituents can, on the one hand, be discharged out of the region of the delivery cell 20 and/or the at least one side channel 19 and, on the other hand, can also be discharged out of the region of the separation space 34, and out of the delivery unit 3, via the discharge channel 46. In this way, the risk of damage to the rotating components, in particular to the compressor wheel or to bearings thereof, is prevented, because remaining heavy constituents, such as for example $H_2O$, lead to formation of ice bridges in the shut-down state of the fuel cell system 1 and in the presence of low ambient temperatures, which ice bridges can damage said components upon starting of the recirculation blower 8. This damage is prevented by way of the discharge of the heavy constituents via the discharge channel 46. Furthermore, the advantage is achieved that, as a result of the heavy constituents being conducted out, a formation of so-called ice bridges between the moving parts, in particular the compressor wheel 12 and the housing 7, in the shut-down state of the fuel cell system 1 and in the presence of low ambient temperatures is prevented.

The invention is not restricted to the exemplary embodiments described here and to the aspects highlighted therein. Rather, within the scope specified by the claims, a large number of modifications are possible which lie within the abilities of a person skilled in the art.

What is claimed is:

1. A delivery unit (3) for an anode circuit (9) of a fuel cell system (1) for delivering a gaseous medium out of an anode region (38) of a fuel cell (2), wherein the delivery unit (3) comprises at least one jet pump (4), wherein the delivery unit (3) is at least indirectly fluidically connected by at least one connecting line (23, 25) to an outlet of the anode region (38), and wherein the delivery unit (3) is fluidically connected by a further connecting line (27) to an inlet of the anode region (38), wherein the delivery unit (3) further comprises a recirculation blower (8) and a dosing valve (6), wherein: (i) flow contours of the jet pump (4), dosing valve (6), and recirculation blower (8) for the gaseous medium are arranged entirely in a common housing (7) and/or (ii) the jet pump (4), dosing valve (6), and recirculation blower (8) are themselves arranged entirely in a common housing (7), and
wherein the recirculation blower (8) has a compressor wheel (12) with an encircling outer delimiting ring (39) which runs rotationally symmetrically with respect to an axis of rotation (48) of the compressor wheel (12), and wherein an at least partially encapsulated separation space (34), and/or a discharge channel (46), is/are situated in the common housing (7) of the delivery unit (3) on a side of the compressor wheel (12) which is averted from the axis of rotation (48).

2. The delivery unit (3) as claimed in claim 1, characterized in that a constituent $H_2O$ and/or a constituent $N_2$ of the gaseous medium is separated off in the recirculation blower (8).

3. The delivery unit (3) as claimed in claim 1, characterized in that the recirculation blower (8) and the jet pump (4) are arranged relative to one another in the common housing (7) such that the axis of rotation (48) of the compressor wheel (12) of the recirculation blower (8) runs perpendicular to a longitudinal axis (50) of the jet pump (4).

4. The delivery unit (3) as claimed in claim 1, characterized in that a gas outlet opening (16) of the recirculation blower (8) transitions directly into a first inflow line (28) and/or an intake region (11) of the jet pump (4) and forms an integrated flow channel (41).

5. The delivery unit (3) as claimed in claim 4, characterized in that the integrated flow channel (41) forms a curvature (43) within the common housing (7), wherein a diversion and/or flow guidance of the gaseous medium between the recirculation blower (8) and the jet pump (4) takes place exclusively in a region of the curvature (43).

6. A fuel cell system (1) having a delivery unit (3) as claimed in claim 1 for controlling a feed of hydrogen to and/or a discharge of hydrogen from the fuel cell (2).

7. The fuel cell system (1) as claimed in claim 6, characterized in that a separation of a constituent $H_2O$ and/or of a constituent $N_2$ from the gaseous medium in the anode circuit (9) is performed by the recirculation blower (8) and/or by a separator (10).

8. The fuel cell system (1) as claimed in claim 7, wherein the separation of a constituent $H_2O$ and/or of a constituent $N_2$ from the gaseous medium in the anode circuit (9) is performed by the separator (10), and wherein the separator (10) is arranged in the anode circuit (9) upstream of the delivery unit (3) in a flow direction V, wherein the anode region (38) is fluidically connected to the separator (10) by a first connecting line (23), and the separator (10) is fluidically connected to the delivery unit (3) by a second connecting line (25), and the delivery unit (3) is fluidically connected to the anode region (38) by a third connecting line (27).

9. The fuel cell system (1) as claimed in claim 7, wherein the fuel cell system (1) includes both the recirculation blower (8) and the separator (10), and wherein a discharge of $H_2O$ and/or $N_2$ from the recirculation blower (8) into the separator (10) takes place in a flow direction VI via a return line (21).

10. The fuel cell system (1) as claimed in claim 9, characterized in that the separation space (34) and/or the discharge channel (46) is/are at least indirectly fluidically connected to a collecting vessel (31) of the separator (10) via the return line (21), wherein the separation space (34) and/or the discharge channel (46) form(s) an elevated pressure level in relation to the collecting vessel (31) of the separator (10), and wherein a discharge of $H_2O$ and/or $N_2$ from the recirculation blower (8) into the separator (10) takes place in the flow direction VI.

11. The fuel cell system (1) as claimed in claim 10, characterized in that the collecting vessel (31) has a discharge valve (44), wherein discharge of all of the $H_2O$ and/or $N_2$ out of a region of the anode circuit (9) takes place via the discharge valve (44).

12. The fuel cell system (1) as claimed in claim 8, characterized in that the second connecting line (25) is arranged in a collecting vessel (31).

13. The fuel cell system (1) as claimed in claim 12, characterized in that a separating edge (37) is arranged in the collecting vessel (31) such that an inflowing gaseous medium passing from the anode region (38) is diverted and/or split up such that a constituent $H_2$ is diverted in a direction of the second connecting line (25), and the constituent(s) $H_2O$ and/or $N_2$ is/are diverted in a direction of a reservoir (18).

14. The fuel cell system (1) as claimed in claim 9, characterized in that the return line (21) has a shut-off valve (26), wherein the shut-off valve (26) is arranged between the recirculation blower (8) and the separator (10).

15. The fuel cell system (1) as claimed in claim 11, characterized in that a first sensor arrangement (22) and/or a second sensor arrangement (24) is/are connected to a control device (14), wherein the first sensor arrangement (22) continuously detects parameters of the separator (10) and the second sensor arrangement (24) continuously detects parameters of the recirculation blower (8), wherein the control device (14) controls opening and closing of the discharge valve (44) and/or of a shut-off valve (26) on a basis of the parameters detected by the first sensor arrangement (22) and/or the second sensor arrangement (24).

16. The fuel cell system (1) as claimed in claim 9, characterized in that the return line (21) has a shut-off valve (26), wherein the shut-off valve (26) is arranged between the recirculation blower (8) and a collecting vessel (31).

17. The delivery unit (3) as claimed in claim 1, characterized in that a constituent $H_2O$ and/or a constituent $N_2$ of the gaseous medium is separated off in the recirculation blower (8) by centrifugal principle in the recirculation blower (8).

* * * * *